(12) United States Patent
Skillermark et al.

(10) Patent No.: US 10,785,700 B2
(45) Date of Patent: Sep. 22, 2020

(54) APPARATUS AND METHOD FOR TRANSMITTING BEACON MESSAGES IN A MESH NETWORK

(71) Applicant: Telefonaktiebolaget LM Ericsson (publ), Stockholm (SE)

(72) Inventors: Per Skillermark, Årsta (SE); Per Elmdahl, Linköping (SE); Wei Shen, Linköping (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

(21) Appl. No.: 16/080,343

(22) PCT Filed: Mar. 14, 2017

(86) PCT No.: PCT/SE2017/050244
§ 371 (c)(1),
(2) Date: Aug. 28, 2018

(87) PCT Pub. No.: WO2017/160211
PCT Pub. Date: Sep. 21, 2017

(65) Prior Publication Data
US 2019/0014528 A1   Jan. 10, 2019

Related U.S. Application Data

(60) Provisional application No. 62/307,719, filed on Mar. 14, 2016.

(51) Int. Cl.
*H04W 40/24* (2009.01)
*H04W 84/18* (2009.01)
(Continued)

(52) U.S. Cl.
CPC ......... *H04W 40/244* (2013.01); *H04W 40/24* (2013.01); *H04W 40/246* (2013.01);
(Continued)

(58) Field of Classification Search
CPC . H04W 40/244; H04W 40/246; H04W 84/18; H04W 92/20; H04W 48/12; H04W 24/02; H04W 92/18; H04W 40/24
See application file for complete search history.

(56) References Cited

U.S. PATENT DOCUMENTS 7,593,731 B2 * 9/2009 Lim .................. H04W 36/26
455/436
8,060,017 B2 * 11/2011 Schlicht .............. H04L 1/0015
455/41.2
(Continued)

FOREIGN PATENT DOCUMENTS

EP        1708439 A1    10/2006
WO   WO 2015/031031 A1    3/2015

OTHER PUBLICATIONS

International Search Report and Written Opinion of the International Searching Authority, PCT/SE2017/050244, dated Apr. 27, 2017, 16 pages.
(Continued)

*Primary Examiner* — Brian T O'Connor
(74) *Attorney, Agent, or Firm* — Sage Patent Group

(57) ABSTRACT

A method in a node of a mesh network comprises receiving a plurality of neighbor count values, each neighbor count value relating to the number of neighbors associated with a particular neighbor of the node, and controlling the transmission of a beacon message based on the received neighbor count values. The method in a node of a mesh network may comprise determining a neighbor count value, the neighbor count value comprising the number of neighbor nodes associated with the node, and distributing the neighbor count value to the neighbor nodes of the node.

19 Claims, 7 Drawing Sheets

(51) Int. Cl.
*H04W 24/02* (2009.01)
*H04W 48/12* (2009.01)
*H04W 92/20* (2009.01)
*H04W 92/18* (2009.01)

(52) U.S. Cl.
CPC .......... *H04W 84/18* (2013.01); *H04W 24/02* (2013.01); *H04W 48/12* (2013.01); *H04W 92/18* (2013.01); *H04W 92/20* (2013.01)

(56) References Cited

U.S. PATENT DOCUMENTS

| | | | | |
|---|---|---|---|---|
| 8,194,541 | B2* | 6/2012 | Leppanen | H04W 40/246 370/230 |
| 8,605,651 | B2* | 12/2013 | Bertani | H04W 74/02 370/328 |
| 8,619,729 | B2* | 12/2013 | Alper | H04L 29/12113 370/254 |
| 8,667,084 | B2* | 3/2014 | Vasseur | H04L 41/145 709/217 |
| 9,060,386 | B2* | 6/2015 | Cha | H04W 84/18 |
| 9,143,912 | B2* | 9/2015 | Leppanen | H04W 76/11 |
| 9,661,603 | B2* | 5/2017 | Aldana | G01S 5/0081 |
| 9,723,582 | B1* | 8/2017 | Tran | H04W 56/001 |
| 9,954,969 | B2* | 4/2018 | Ma | H04L 67/2814 |
| 10,149,232 | B2* | 12/2018 | Kim | H04W 48/16 |
| 2005/0243765 | A1* | 11/2005 | Schrader | H04L 41/00 370/328 |
| 2009/0135758 | A1* | 5/2009 | Alper | H04L 29/12113 370/328 |
| 2010/0189005 | A1* | 7/2010 | Bertani | H04W 74/02 370/252 |
| 2010/0260071 | A1* | 10/2010 | Lai | H04L 45/22 370/256 |
| 2010/0284318 | A1 | 11/2010 | Sawada | |
| 2013/0198305 | A1* | 8/2013 | Veillette | H04L 51/00 709/206 |
| 2013/0232223 | A1* | 9/2013 | Ma | H04L 67/2814 709/217 |
| 2014/0136881 | A1* | 5/2014 | Vasseur | H04L 41/145 714/4.11 |
| 2014/0219091 | A1 | 8/2014 | Hellhake et al. | |
| 2014/0355524 | A1* | 12/2014 | Li | H04W 4/38 370/328 |
| 2015/0146710 | A1* | 5/2015 | Gelal | H04W 74/0808 370/338 |
| 2016/0080516 | A1* | 3/2016 | Ma | H04L 67/2814 709/204 |
| 2016/0142252 | A1* | 5/2016 | Garg | H04L 41/0806 455/424 |
| 2016/0269979 | A1* | 9/2016 | Ide | H04W 52/0219 |
| 2016/0353329 | A1* | 12/2016 | Kakani | H04W 24/08 |
| 2017/0006423 | A1* | 1/2017 | Youssef | G01S 1/685 |
| 2017/0006483 | A1* | 1/2017 | Attanasio | H04L 43/0876 |
| 2017/0223553 | A1* | 8/2017 | Aldana | G01S 5/0081 |
| 2017/0346891 | A1* | 11/2017 | Yasuda | H04L 67/1068 |
| 2017/0359696 | A1* | 12/2017 | Yasuda | H04W 4/029 |
| 2018/0027386 | A1* | 1/2018 | Zampini, II | H04W 52/0296 370/311 |
| 2018/0219729 | A1* | 8/2018 | Garg | H04L 41/0806 |
| 2018/0302317 | A1* | 10/2018 | Ge | H04L 45/122 |

OTHER PUBLICATIONS

Supplementary European Search Report, European Search Report Communication, NPL copyright statement, and Search Strategy Information, EP 17 76 7065, dated Jan. 18, 2019, 4 Pages.
Panneer Muthukumaran et al., MeshMAC: Enabling Mesh Networking over IEEE 802.15.4 through Distributed Beacon Scheduling, XP002788181, May 17, 2014, pp. 1-17.

* cited by examiner

APPARATUS AND METHOD FOR TRANSMITTING BEACON MESSAGES IN A MESH NETWORK

CROSS REFERENCE TO RELATED APPLICATIONS

This application is a 35 U.S.C. § 371 national stage application of PCT International Application No. PCT/SE2017/050244 filed on Mar. 14, 2017, which in turns claims domestic priority to U.S. Provisional Patent Application No. 62/307,719, filed on Mar. 14, 2016, the disclosures and content of which are incorporated by reference herein in their entirety.

TECHNICAL FIELD

The examples described herein relate to an apparatus and method for transmitting beacon messages in a mesh network, and in particular to an apparatus and method for determining a transmission frequency and/or the scheduling of beacon messages in a mesh network, for example a Bluetooth Low Energy (BLE) mesh network.

BACKGROUND

Most wireless networks transmit some predefined signals or broadcast certain messages to advertise their existence and let users, either existing or new potential users, find information about the network. For example, base stations in cellular networks transmit (physical) synchronization signals that users can search for. These synchronization signal(s) provide time and frequency synchronization, but also enable the users to find other signals and messages that contain information about the network and how to access it. Similarly, access points (APs) in WiFi networks transmit beacon messages or signals at regular intervals. The beacon messages contain, for example, a timestamp and the network identifier or name (e.g. a Service Set Identifier, SSID).

Beacon messages or signals are also defined as part of mesh networks, for example as part of a Bluetooth Low Energy (BLE) mesh network. Such mesh beacon messages are considered to be network layer packets. One type of beacon message is referred to as Secure Network Broadcast (SNB) beacon message, which is regularly transmitted by all relay nodes. The SNB beacon messages contain the Network Identifier (NID) and the Current Initialization Vector Index (CIVI). The NID facilitates that nodes located inside the coverage area of the network can discover the network, and understand that the node shares the same Network Key and therefore can communicate with the network. The CIVI is a number that is incremented each time the Sequence Numbers of packets in the network are about to wrap, in order to prevent replay attacks despite the Sequence Numbers wrapping. If a node picks up a SNB beacon message in which the IV index has been updated, it will start to use this new IV for encryption and authentication when transmitting and receiving data. It will also update the content of its own beacon message to reflect the state change such that the IV index change propagates to the neighboring nodes and eventually to all nodes in the mesh network.

As one purpose of the SNB beacon message is to update other network nodes of an IV Index update, it is desirable that such changes propagate quickly through the network. For example, a current design goal is that each node should receive a beacon message approximately every 10 seconds.

One solution for transmitting beacon messages involves the use of a predefined beacon transmission frequency, independent of the number of nodes in the network and the density. However, such a solution must be defined for the worst case, i.e., for a case with a low number of nodes and/or a low network density. This means, in turn, that in a majority of the cases the transmission frequency of the beacon signal will be unnecessarily high and cause an excessive load on the network. This results in unnecessary packet collisions and reduced packet reception probabilities, both for mesh data traffic and mesh beacon messages or signals. The problem with using an unnecessarily high transmission frequency grows with the size of the network and the network density.

SUMMARY

It is an aim of embodiments disclosed herein to provide a method and apparatus which obviate or reduce at least one or more of the disadvantages mentioned above.

According to a one aspect there is provided a method in a node of a mesh network. The method comprises determining a neighbor count value, the neighbor count value comprising the number of neighbor nodes associated with the node. The method further comprises distributing the neighbor count value to the neighbor nodes of the node.

According to another aspect there is provided a method in a node of a mesh network. The method comprises receiving a plurality of neighbor count values, each neighbor count value relating to the number of neighbors associated with a particular neighbor of the node. The method further comprises controlling the transmission of a beacon message based on the received neighbor count values.

According to another aspect there is provided a node for a mesh network. The node is adapted to determine a neighbor count value, the neighbor count value comprising the number of neighbor nodes associated with the node. The node is further adapted to distribute the neighbor count value to the neighbor nodes of the node.

According to another aspect there is provided a node for a mesh network for transmitting beacon messages. The node is adapted to receive a plurality of neighbor count values, each neighbor count value relating to the number of neighbors associated with a particular neighbor of the node. The node is further adapted to control the transmission of a beacon message based on the received neighbor count values.

According to another aspect there is provided a node for a mesh network. The node comprises a processor and a memory, said memory containing instructions executable by said processor. The node is operative to determine a neighbor count value, the neighbor count value comprising the number of neighbor nodes associated with the node. The node is operative to distribute the neighbor count value to the neighbor nodes of the node.

According to another aspect there is provided a node for a mesh network. The node comprises a processor and a memory, said memory containing instructions executable by said processor. The node is operative to receive a plurality of neighbor count values, each neighbor count value relating to the number of neighbors associated with a particular neighbor of the node. The node is operative to control the transmission of a beacon message based on the received neighbor count values.

According to another aspect there is provided a node for a mesh network. The node comprises a first module configured to determine a neighbor count value, the neighbor count value comprising the number of neighbor nodes associated with the node. The node comprises a second module configured to distribute the neighbor count value to the neighbor nodes of the node.

According to another aspect there is provided a node for transmitting beacon messages in a mesh network. The node comprises a first module configured to receive a plurality of neighbor count values, each neighbor count value relating to the number of neighbors associated with a particular neighbor of the node. The node comprises a second module configured to control the transmission of a beacon message based on the received neighbor count values.

According to another aspect there is provided a method in a node of a mesh network. The method comprises receiving a plurality of neighbor count values, each neighbor count value relating to the number of neighbors associated with a particular neighbor of the node. The method comprises controlling operation of the node based on the received neighbor count values.

According to another aspect there is provided a method in a node of a mesh network. The method comprises receiving a plurality of neighbor count values, each neighbor count value relating to the number of neighbors associated with a particular neighbor of the node. The method comprises configuring packet forwarding policies based on the received neighbor count values.

According to another aspect there is provided a method in a node of a mesh network. The method comprises receiving a plurality of neighbor count values, each neighbor count value relating to the number of neighbors associated with a particular neighbor of the node. The method comprises estimating network density based on the neighbour count values. The method comprises configuring one or more network parameters based on the estimated network density.

BRIEF DESCRIPTION OF DRAWINGS

For a better understanding of the examples described herein and to show more clearly how the examples may be carried into effect, reference will now be made, by way of example only, to the following drawings in which.

DETAILED DESCRIPTION

Figure 1:
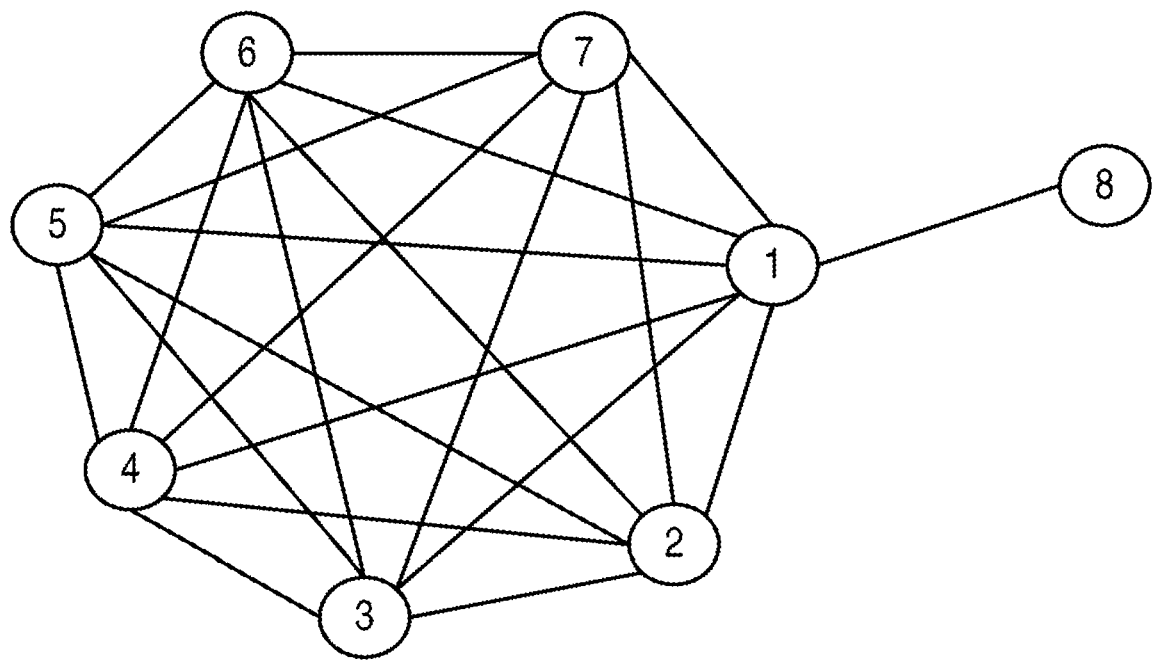
FIG. 1 shows an example of a mesh network.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers. Nodes that communicate using the air interface also have suitable radio communications circuitry. Moreover, where appropriate certain aspects of the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

In terms of computer implementation, a computer is generally understood to comprise one or more processors, one or more processing units, one or more processing modules or one or more controllers, and the terms computer, processor, processing unit, processing module and controller may be employed interchangeably. When provided by a computer, processor, processing unit, processing module or controller, the functions may be provided by a single dedicated computer, processor, processing unit, processing module or controller, by a single shared computer, processor, processing unit, processing module or controller, or by a plurality of individual computers, processors, processing units, processing modules or controllers, some of which may be shared or distributed. Moreover, these terms also refer to other hardware capable of performing such functions and/or executing software, such as the example hardware recited above.

In the examples described below reference is made to "mesh" networks. It is noted that any reference to a mesh network is also intended to embrace multi-hop networks.

In the examples described below reference is also made to "neighbor" nodes. A neighbor node of a particular node is a node that can communicate directly with that particular node. A neighbor node can hear or communicate with the particular node to which it is a neighbor, and vice versa. There is a direct communication link between a node and a neighboring node of that node. A node may have any number of neighboring nodes.

As described in the background section, it is generally desirable to limit the number of beacon messages transmitted in a network, i.e. in order to improve the beacon messages' medium utilization. To help reduce the number of beacon messages a node may adapt the transmission frequency of its beacon message, for example the transmission frequency of a Secure Network Broadcast (SNB) beacon message, for example based on the network density and connectivity conditions.

One such proposal involves a node being able to adapt its beacon transmission frequency based on the number of beacons received from other nodes during some observation time period, for example where the transmission frequency will be inversely proportional to the number of beacons received. In essence, this means that a node adapts its beacon transmission frequency based on its number of neighbor nodes. However, such a solution does not scale well, and can be effected by networks in which different nodes have different numbers of neighbors.

FIG. 1 shows an example of a network comprising N nodes, where N=8. If a beacon message having a fixed frequency is used as described in the background, whereby the frequency of the beacon messages is designed for the worst case single neighbor situation, node n=8 of FIG. 1 receives beacon signals with an appropriate frequency. Other nodes, however, receiving beacon messages from all neighbor nodes receive beacon messages with a frequency that is seven, or sometimes eight, times higher than necessary.

Furthermore, to allow the nodes of FIG. 1 to derive their respective transmission frequency based on the number of beacon signals received from other nodes during some observation time period, although this might work well in networks in which all nodes have approximately the same number of neighbors, there is a risk to adapt the nodes' beacon transmission frequency not only poorly but actually in direct conflict with the design objectives when the number of neighbors differs significantly among nodes.

This point can also be illustrated further with reference to the network of FIG. 1, with N nodes n=1, 2, ..., N, where N=8, in which the nodes n=1, 2, ..., N−1 all are connected but the node n=N (i.e. node n=8) only hears one of the other nodes, here node n=1.

If it is assumed further that the design objective is that nodes should, on average, receive beacons with some minimum frequency, then the nodes with many neighbors, i.e., nodes n=1, 2, ..., N−1, will all receive beacons from many (N−2) neighbors and will adapt their respective beacon transmission frequency to a relatively low value. For simplicity, it is noted that the fact that node n=1 actually hears N−1 other nodes is neglected here.

The beacon reception rate in the group, however, is appropriate as every node in the group receives beacons from several neighbors. But, the node n=N (i.e. node n=8), who only picks up beacons from the node n=1 will receive beacons with a relatively low frequency. As a consequence node n=8 will increase its beacon transmission rate which will trigger node n=1 to lower its frequency even further, and so on. The end result is that the node n=8 receives beacons with a frequency that is too low, and transmits beacons with a frequency that is unnecessarily high. The solution may even be instable.

According to a first example described herein, it is proposed to base a mesh node's beacon transmission frequency and/or scheduling and/or actual time of transmission on the number of neighbors of its neighbors. According to one example the beacon transmission frequency is set such that the neighbor with the lowest number of neighbors receives beacons with a sufficiently high frequency. Receiving beacons with a sufficiently high frequency can depend on design parameters for a particular application, i.e. based on some design choice regarding how many beacon signals a node should ideally receive. As such, the beacon transmission frequency is set according to such an embodiment so that the neighbor with the lowest number of neighbors receives beacons at this sufficiently high frequency. The frequency may correspond, for example, to a target average beacon reception frequency (as discussed later in the application), or some minimum threshold reception frequency, or correspond to some form of range of frequencies that a node should receive beacon signals, e.g. whereby a node receives between a minimum and maximum number of beacon signals within a given period. In an example of beacon messages in a mesh network, a beacon message may be used to update an Initialization Vector (IV) Index of each node in a mesh network. It is desirable that such changes propagate quickly through the network, e.g., each node should receive a beacon message approximately every 10 seconds.

To facilitate the above, each node in the mesh network determines or estimates its own number of neighbors. It then conveys this information to its neighbor nodes such that the information can be used by the neighbor nodes when controlling their beacon transmissions, for example controlling the frequency of beacon messages and/or the scheduling of beacon messages and/or the actual time of transmission of beacon messages.

Figure 2:
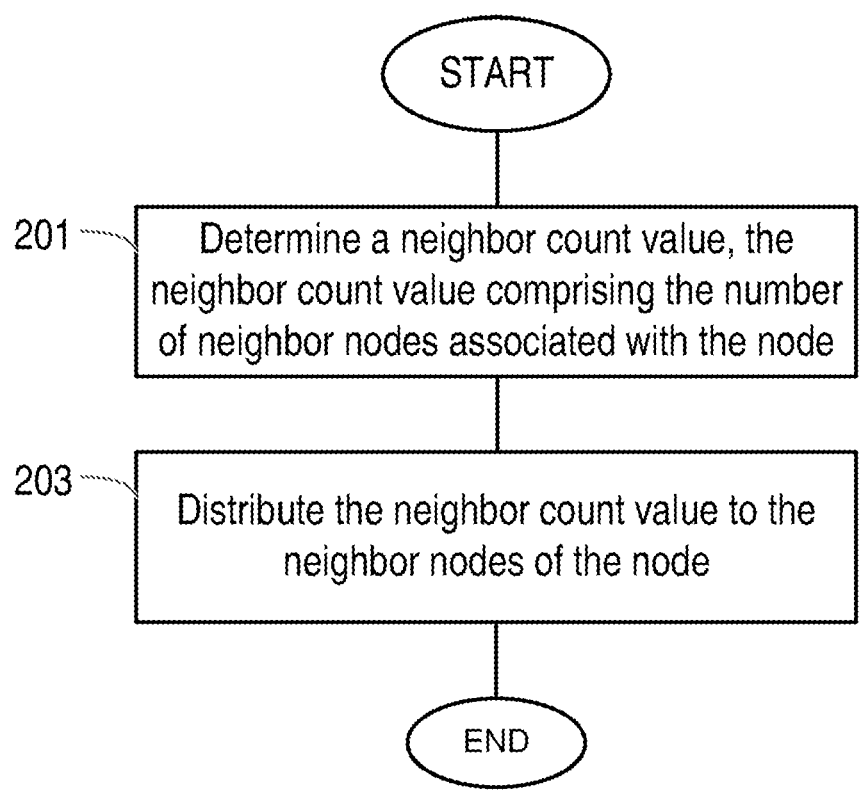
FIG. 2 shows a method according to an embodiment.

FIG. 2 shows a method in a node of a mesh network according to an embodiment. The method comprises determining a neighbor count value, the neighbor count value comprising the number of neighbor nodes associated with the node, step 201. The method further comprises distributing the neighbor count value to the neighbor nodes of the node, step 203.

It is noted that the number of neighbour nodes may comprise any value, including zero, one or any other integer.

The step of determining a neighbor count value may comprise estimating the number of neighbor nodes to the node.

In one example, determining or estimating the neighbor count value may comprise analysing network data traffic within the mesh network, and counting the number of copies that are received of a mesh network data packet. As such, the number of neighbors is estimated by analyzing the mesh network's data traffic.

For example, in a mesh network such as a Bluetooth Low Energy (BLE) mesh network, or a BLE Smart Mesh network, in which flooding may be used for data communication, a node may, for example, estimate its number of neighbors by analyzing the regular flooding mesh network data packets and determining the number of neighbors based on the number of copies that are received of each mesh packet. As all relay nodes (in flooding mesh networks) forward all received data packets the number of neighbors can therefore be estimated by recording the number of copies of a packet that is received. Moreover, as a mesh network packet is uniquely defined by the source address and the sequence number, in one example the number of neighbors can simply be estimated as the number of network packets with equal source address and sequence number that are received, for example within some observation time window.

Thus, in one example step 201 of FIG. 2, for determining or estimating the neighbor count value, comprises counting the number of copies that are received of each mesh network data packet.

It is noted that, when observing mesh network data packets, the examples may therefore range from checking just a particular packet to see how many copies are received, to checking a group or set of packets to determine how many copies of each are received, to checking all packets to determine how many copies of each are received, all of which may be performed for example within a certain time period or window. The examples may either use absolute values to determine how many neighbour nodes exist, or determine the number of nodes based on the average number of copies of a packet received, or a minimum or a maximum value. It is thus noted that various alternatives exist for estimating the number of nodes based on the monitoring of packets received at the node. In one example packets are observed during an observation time period. If multiple unique packets are received within this time window, the method obtains an estimate associated with each unique packet. From that the method may derive a "final" estimate by taking an average, minimum or maximum or similar.

It is also noted that the "copies" referred to above may relate to redundant packets for a unique mesh network data packet. Each mesh node may comprise a cache to filter the recently seen messages for a certain time. The examples described herein can extend the function of such a message cache, by counting the number of copies received for a unique packet, to estimate the number of neighbors. Several unique packets may be used to obtain several results (number of neighbors). Then, as mentioned above, the average, minimum or maximum can be used to derive the final estimate of the number of neighbors.

In another embodiment, the number of neighbors may be estimated by analyzing the address, for example the Medium Access Control (MAC) address (e.g. advertising address, AdvA) of the packets received at the node. This information is included for example in the payload of the link layer advertisement protocol data unit. It is noted that this is the link layer sender's address, which is typically not the same as the network source address. This estimation can be performed on the mesh network's data traffic and/or on the beacon messages by analyzing the number of unique link layer AdvA addresses, for example within some time window.

Thus, according to another example the step of determining or estimating the neighbor count value comprises analysing network data traffic within the mesh network, and counting the number of unique MAC address from which packets are received in the mesh network. The received packets may comprise link layer packets, and include mesh data messages and/or beacon messages.

In another embodiment, the beacon messages include an identifier, which identifies the sending node. This identifier could be, for example, a random number, or a unique identifier, for example a Universally Unique Identifier (UUID), or the source address of the sending node, or any other identifier. This way, receivers of the beacon messages count the number of unique neighbors heard, for example within some time window. The identifier can be sent in the clear, or be encrypted or be hashed. Source addresses or other identifiers sent in the clear may be a security risk; therefore, encrypting the identifier reduces such a security risk. By hashing a source address, the number of source addresses can be counted, even without disclosing the actual source address.

Thus, according to one example the step of determining or estimating the neighbor count value comprises counting the number of source mesh addresses, or other identifiers, included in messages received at the node. The messages may comprise data traffic and/or beacon messages received at the node. In another example, the step of determining or estimating the neighbor count value comprises explicitly inquiring neighbors to send a response message.

For each of the above embodiments and examples, the node can filter the packets such that the node only counts the packets which are part of the node's own network. This can be achieved, for example, by the node decrypting and authenticating the packet with its network key. If the packet can be decrypted and authenticated using the network key, the packet is counted.

The neighbor count value (i.e. number of neighbors) can be distributed to a neighbor of a node in a number of ways. One method is to include the number of neighbors (neighbor count value) in beacon messages, for example in an existing mesh beacon message, such as a smart mesh beacon message.

In such an example step 203 of FIG. 2, for distributing the neighbor count value to the neighbor nodes of the node, may comprise including the neighbor count value within a beacon message transmitted from the node. A node may therefore distribute its number of neighbors by including it in its own beacon message.

In another example the number of neighbors (neighbor count value) is distributed or conveyed in a separate message type, for example a new beacon type called "Neighbor Count Beacon".

In such an example step 203 of FIG. 2, for distributing the neighbor count value to the neighbor nodes of the node, may comprise including the neighbor count value within a message type that is separate from a beacon message transmitted from the node.

In yet another example, the number of neighbors (neighbor count value) may be included in a separate mesh network packet reusing the existing mesh advertising data (AD or Adv) type (for example BLE advertising channels in a BLE mesh network), but using an indicator in the network header identifying the type of the packet, e.g., using the Application Key Flag (AKF) and Application Key Identifier (AID) fields.

Figure 3:
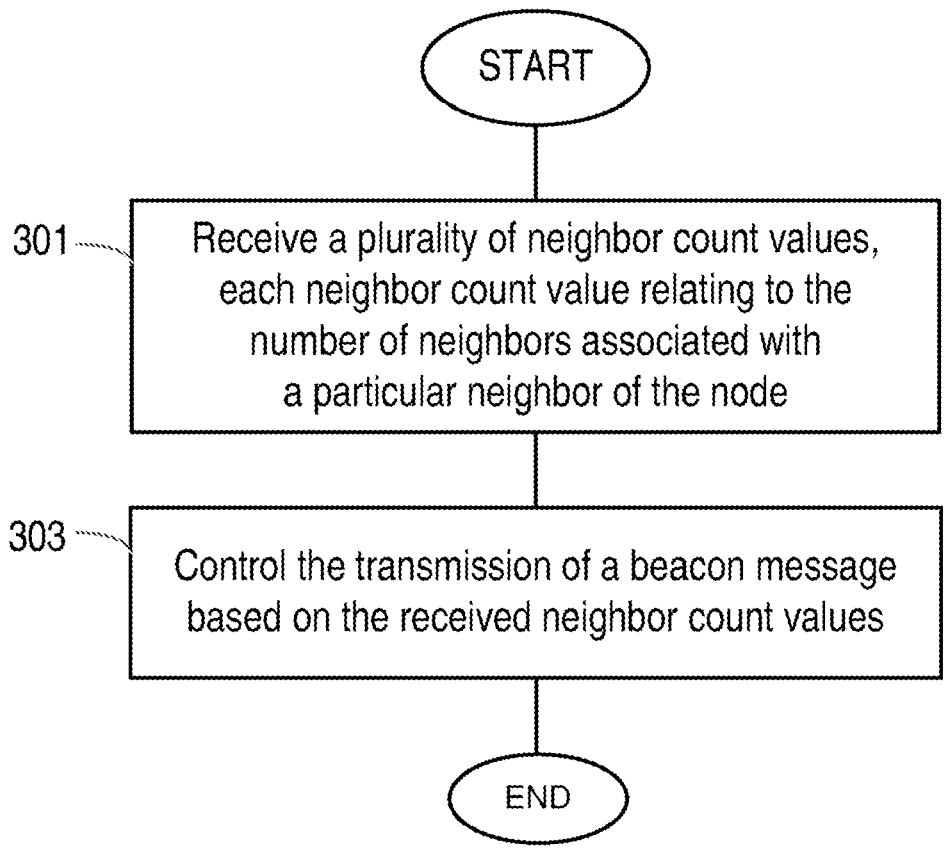
FIG. 3 shows a method according to another embodiment.

FIG. 3 shows a method in a node of a mesh network according to another embodiment. The method comprises receiving a plurality of neighbor count values, each neighbor count value relating to the number of neighbors associated with a particular neighbor of the node, step 301. The method further comprises controlling the transmission of a beacon message based on the received neighbor count values, step 303.

In some examples the step of controlling the transmission of a beacon message comprises controlling the frequency of transmission of beacon messages from the node. The step of controlling the transmission of a beacon message may comprise, either in addition or as an alternative, controlling the scheduling of transmission of beacon messages from the node.

In some examples the step of controlling the transmission of a beacon message may comprise, either in addition or as an alternative to the above, controlling the time that beacon messages are transmitted from the node.

These embodiments are therefore concerned with the procedure of receiving and collecting information about the number of neighbors of the neighbor nodes, and using this when controlling the beacon transmission (e.g. controlling the frequency and/or scheduling and/or time of beacon message transmissions). Each node can receive information from its neighbor nodes about their number of neighbors (i.e. receive a neighbor count value from each neighbor).

In some examples, information about the number of neighbors of the neighbors can be received or collected during some observation time period T. For example, using periodic measurement collections or a sliding window.

In one embodiment the plurality of neighbour count values are received from a higher network layer, for example a control plane having knowledge of the connectivity of nodes within the mesh network. In such an example, rather than receiving neighbour count values from the neighbors themselves, this information is instead received from elsewhere, for example from a network node or layer or some other entity that has knowledge of the network, and how many neighbor nodes are associated with each node.

In one embodiment controlling the transmission of a beacon message is related to the lowest neighbor count value received from neighboring nodes.

For example, if we let $L_k$ denote the number of neighbors of node k. The controlling of the transmission of beacon messages at node n can then be determined based on the recorded number of neighbors of all the neighbors $L_k$, where $k \in B(n)$, and $B(n)$ is the set of nodes that are neighbors to node n.

In one embodiment, the average mesh beacon transmission frequency at node n, $g_n$, is determined based on the minimum number of neighbors of the neighbors, e.g.:

$$g_n = f(L_{k,min}) = k \cdot G / L_{k,min},$$

where G is the target average beacon reception frequency, k some proportionality constant, and $L_{k,min}$ is the minimum number of neighbors of the neighbors (lowest neighbor count value), i.e.:

$$L_{k,min} \leq L_k \forall k \in B(n)$$

In other words, $L_{k,min}$ is smaller than or equal to $L_k$ for all values of k (i.e. use the minimum number of neighbors from all the neighbors).

The actual time of the beacon transmission at node n may, for example, be determined by drawing a random number $d_n$ from a distribution $D_n$ where $E[d_n]=1/g_n$. The distribution $D_n$ may, for example, be uniformly distributed $[0, 2/g_n]$.

To limit the variation between nodes, in some examples the transmission frequency of beacon messages from a node can be constrained within some lower and some upper limit, for example:

$$g_n = \min(\max(g_{min}, g_n), g_{max}).$$

Furthermore, in some examples to smoothen the variation over time of the transmission frequency of beacon messages from a node, the beacon transmission frequency may be determined based on the previously used value and the newly derived value, for example:

$$g_n[m+1] = \alpha \cdot g_n[m] + (1-\alpha) \cdot g_n,$$

where $g_n[m]$ is the beacon transmission frequency at time instant m, $g_n$ is the newly derived beacon transmission frequency based on the number of neighbors of the neighbors, and $\alpha$ is a variable in the range $[0,1]$. $g_n[0]$ may, for example, be initiated to G (i.e. the target average beacon reception frequency).

From the above it can be seen that the embodiments described herein propose a method for mesh beacon transmission scheduling that can adapt to the network's connectivity conditions. Each relay node in the mesh network can estimate its number of neighbors and distribute this information to its own neighbors. Accordingly, nodes get informed about the number of neighbors of the neighbors, and based on this information the transmission of beacon messages can be controlled, for example the average transmission frequency of the nodes' mesh beacon can be determined.

From the above it can be seen that, in some examples, the following steps are performed in a mesh network:
- each node estimates the number of its neighbors;
- each node distributes or conveys the estimation of its number of neighbors to the node's neighbors;
- each node controls mesh beacon transmissions, e.g. transmission frequency and/or scheduling and/or actual timing based on the number of neighbors of the neighbors.

The examples described herein provide a method and apparatus by which the transmission of beacon messages, for example their transmission frequency and/or scheduling and/or timing, can be adapted to the connectivity conditions in the mesh network. Each node can adapt its beacon transmissions such that its neighbors receive beacons with a sufficiently high frequency. Compared to a solution in which a fixed, pre-determined beacon transmission frequency is utilized, the examples described herein have the advantage of limiting the beacon load on the wireless medium, reducing the packet collision probability and increasing the reception probability of both mesh data packets and mesh beacons. Reducing the number of transmitting beacons may further limit a relay node's power consumption.

In some examples the transmission of beacon messages can be controlled dynamically, e.g. based on varying network connectivity of nodes.

The examples have the advantage of being able to scale with network size and density. The examples also provide an improved solution in networks where different nodes have dissimilar numbers of neighbors.

A method performed by a node in a mesh network, for example a BLE Mesh network, may comprise estimating its number of neighbors, and distributing this information to its own neighbors The estimation of the number of neighbors may be performed by analyzing the BLE mesh network data traffic and counting the number of copies that is received of each mesh network data packet. The estimation of the number of neighbors may be performed by identifying the number of unique Medium Access Control, MAC, addresses from which link layer packets, including mesh data messages and/or beacon messages, are received in the mesh network. Alternatively, the estimation may be performed by counting the number of source mesh addresses, or other identifiers, included in the received messages. Alternatively, explicitly inquiries may be sent to neighbors to send a response message, in order to determine the number of neighbors. The number of neighbors is distributed to the node's own neighbors.

A node can distribute its number of neighbors by means of including the information in its beacon message. Alternatively, a node can distribute its number of neighbors by sending it in a separate message type.

According to another embodiment, there is provided a method performed by a node in a BLE mesh network that receives information about the number of neighbors of its neighbors, and determines its own mesh beacon transmission frequency based on the number of neighbors of the neighbors. The mesh beacon transmission scheduling may be determined based on the minimum number of neighbors that any of the neighbor nodes has.

According to another embodiment there is provided a node of a mesh network. The node is adapted to determine a neighbor count value, the neighbor count value comprising the number of neighbor nodes associated with the node. The node is further adapted to distribute the neighbor count value to the neighbor nodes of the node.

According to another embodiment there is provided a node of a mesh network for transmitting beacon messages. The node is adapted to receive a plurality of neighbor count values, each neighbor count value relating to the number of neighbors associated with a particular neighbor of the node. The node is further adapted to control the transmission of a beacon message based on the received neighbor count values.

Figure 4:
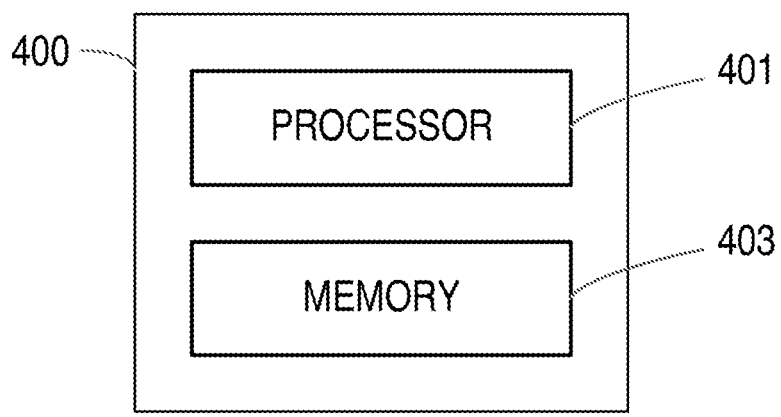
FIG. 4 shows a network node according to an embodiment.

FIG. 4 shows an example of an embodiment of a node 400 for a mesh network. The node 400 comprises a processor 401 and a memory 403, said memory 403 containing instructions executable by said processor 401. The node 400 is operative to determine a neighbor count value, the neighbor count value comprising the number of neighbor nodes associated with the node, and distribute the neighbor count value to the neighbor nodes of the node.

In one example the node is operative to determine a neighbor count value by estimating the number of neighbor nodes to the node.

In one example the node is operative to determine or estimate the neighbor count value by analysing network data traffic within the mesh network, and counting the number of copies that are received of a mesh network data packet.

In one example the node is operative to determine or estimate the neighbor count value by counting the number of copies that are received of each mesh network data packet.

In one example the node is operative to determine or estimate the neighbor count value by analysing network data traffic within the mesh network, and counting the number of unique MAC address from which packets are received in the mesh network.

In one example the received packets are link layer packets, and include mesh data messages and/or beacon messages.

In one example the node is operative to determine or estimate the neighbor count value by counting the number of source mesh addresses, or other identifiers, included in messages received at the node.

In one example the node is operative to determine or estimate the neighbor count value by explicitly inquiring neighbors to send a response message.

In one example the node is operative to determine or estimate the number of neighbour nodes within a time window.

In one example the node is operative to distribute the neighbor count value to the neighbor nodes of the node by including the neighbor count value within a beacon message transmitted from the node.

In one example the node is operative to distribute the neighbor count value to the neighbor nodes of the node by including the neighbor count value within a message type that is separate from a beacon message transmitted from the node.

In one example the node is operative to distribute the neighbor count value to the neighbor nodes of the node by including the neighbor count value in a mesh network packet by reusing an existing mesh AD type.

In one example the node is operative to convey the neighbour count value using an indicator in a network header identifying the type of the packet, or using a dedicated transport control opcode, or using an Application Key Flag, AKF, or Application Key Identifier, AID, field.

According to another example, FIG. 4 shows an embodiment of a node 400 for a mesh network. The node 400 comprises a processor 401 and a memory 403, said memory 403 containing instructions executable by said processor 401. The node 400 is operative to receive a plurality of neighbor count values, each neighbor count value relating to the number of neighbors associated with a particular neighbor of the node, and control the transmission of a beacon message based on the received neighbor count values.

In one example, the node is operative to control the transmission of a beacon message by controlling the frequency of transmission of beacon messages from the node.

In one example, the node is operative to control the transmission of a beacon message by controlling the scheduling of transmission of a beacon message from the node.

In one example, the node is operative to control the transmission of a beacon message by controlling the time that a beacon message is transmitted from the node.

In one example, the node is operative to control the transmission of a beacon message based on the lowest neighbor count value associated with neighbor nodes.

In one example, the node is operative to control the transmission of a beacon message in an inversely proportional relationship to the lowest neighbor count value associated with neighbor nodes.

Figure 5:
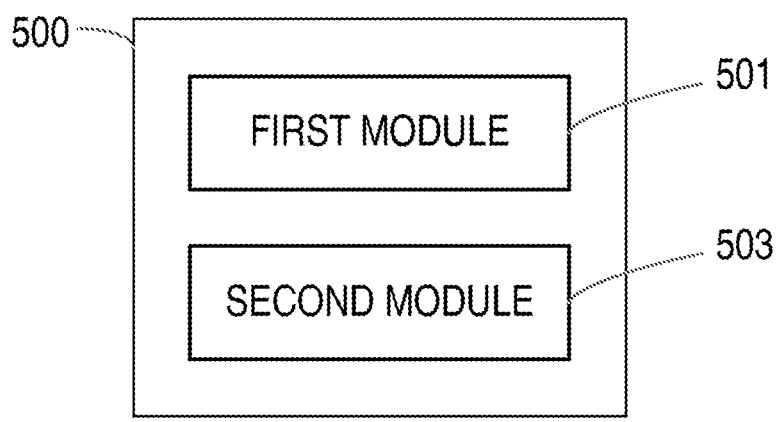
FIG. 5 shows a network node according to another embodiment.

FIG. 5 shows an example of a node 500 according to another embodiment for a mesh network. The node 500 comprises a first module 501 configured to determine a neighbor count value, the neighbor count value comprising the number of neighbor nodes associated with the node. The node 500 comprises a second module 503 configured to distribute the neighbor count value to the neighbor nodes of the node.

According to another example, FIG. 5 shows an embodiment of a node 500 for transmitting beacon messages in a mesh network. The node 500 comprises a first module 501 configured to receive a plurality of neighbor count values, each neighbor count value relating to the number of neighbors associated with a particular neighbor of the node. The node 500 comprises a second module 503 configured to control the transmission of a beacon message based on the received neighbor count values.

In the examples and embodiments described above it is noted that, once a node has access to information of the number of neighbors of its neighbors, this information is used to control transmission of beacon messages. It is noted, however, that this information may also be used for other purposes.

Figure 6:
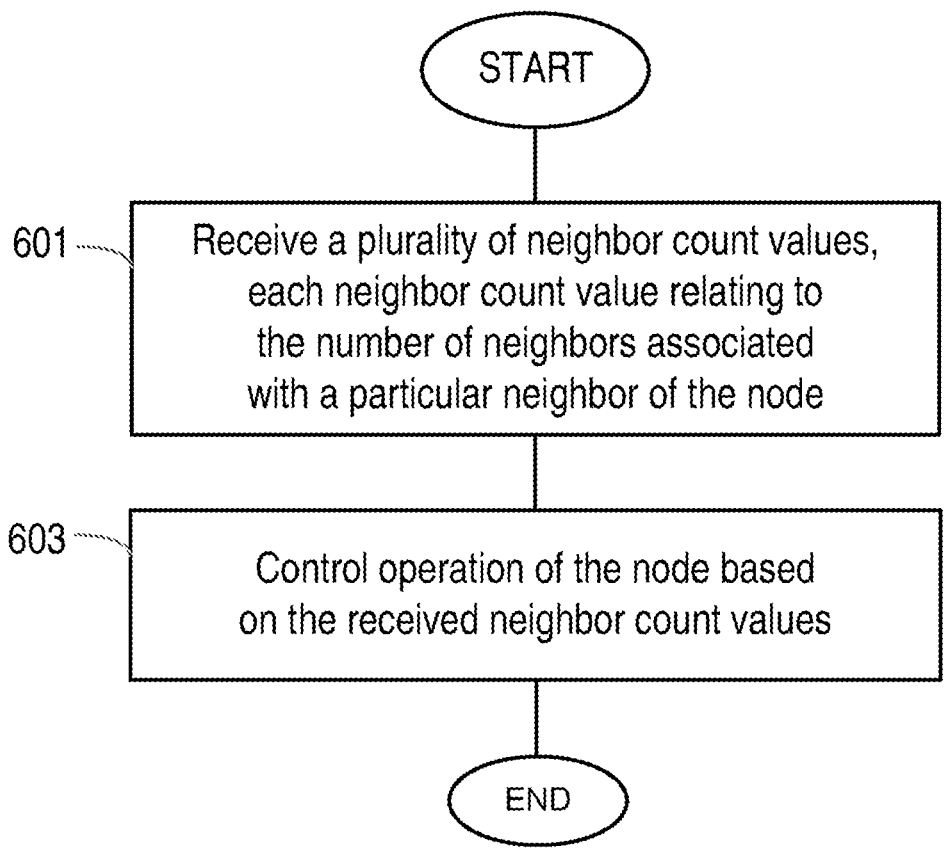
FIG. 6 shows a method according to an embodiment.

For example, referring to FIG. 6, this shows an embodiment according to another example, in a node of a mesh network. The method comprises receiving a plurality of neighbor count values, each neighbor count value relating to the number of neighbors associated with a particular neighbor of the node, step 601. In step 603, the method comprises controlling operation of the node based on the received neighbor count values.

Figure 7:
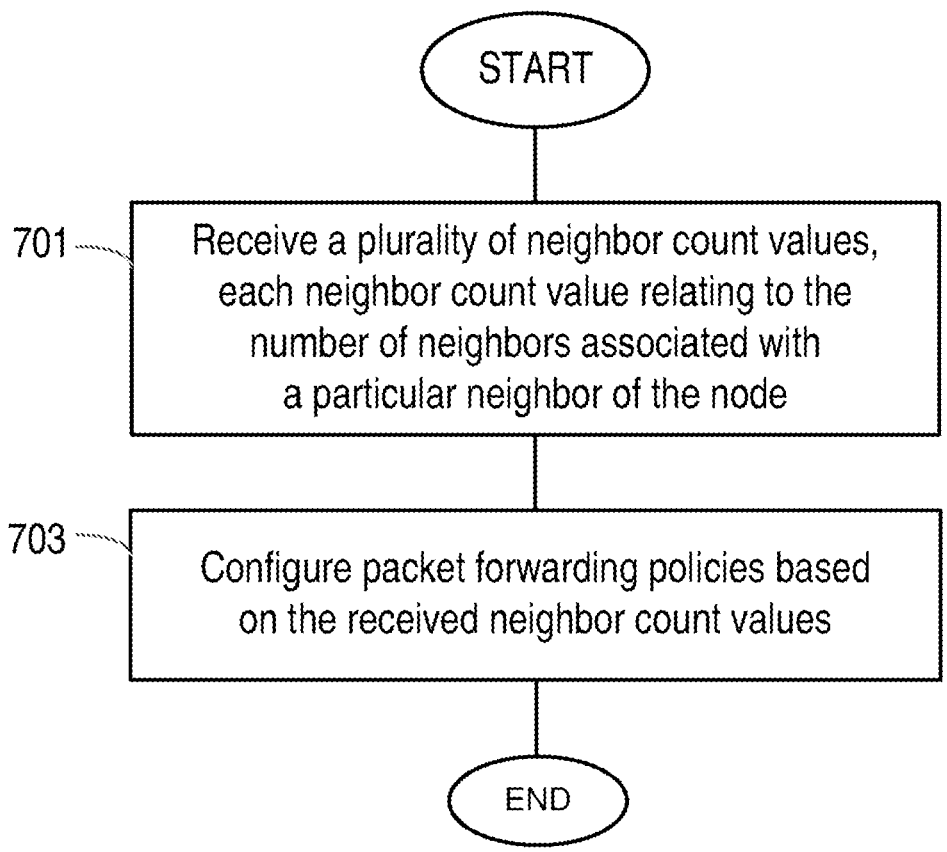
FIG. 7 shows a method according to an embodiment.

FIG. 7 shows an embodiment according to another example, in a node of a mesh network. The method comprises receiving a plurality of neighbor count values, each neighbor count value relating to the number of neighbors associated with a particular neighbor of the node, step 701. In step 703 the method comprises configuring packet forwarding policies based on the received neighbor count values, for example packet forwarding policies in flooding mesh networks.

Figure 8:
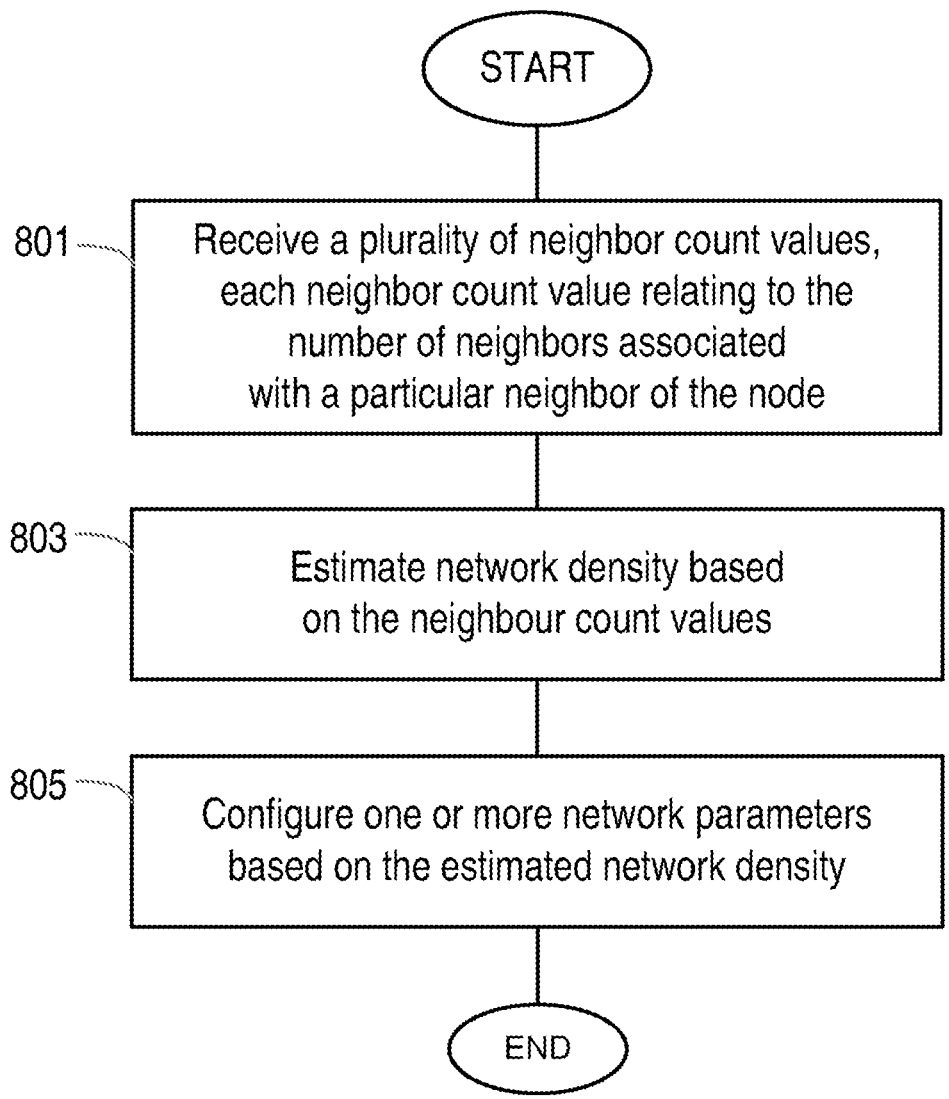
FIG. 8 shows a method according to an embodiment.

FIG. 8 shows an embodiment according to another example, in a node of a mesh network. The method comprises receiving a plurality of neighbor count values, each neighbor count value relating to the number of neighbors associated with a particular neighbor of the node, step 801. The method comprises estimating network density based on the neighbour count values, step 803. In step 805 the method comprises configuring one or more network parameters based on the estimated network density. In one example this comprises configuring a message cache size.

It is noted that the network nodes of FIGS. 4 and 5 may be configured to perform the methods of the examples shown in FIGS. 6, 7 and 8, either in addition or as alternatives to the methods of the examples of FIGS. 2 and 3.

It should be noted that the above-mentioned embodiments are provided to be illustrative rather than limiting, and that those skilled in the art will be able to design many alternative embodiments without departing from the scope of the examples disclosed here. The word "comprising" does not exclude the presence of elements or steps other than those described, "a" or "an" does not exclude a plurality, and a single processor or other unit may fulfil the functions of several units recited in the various examples disclosed

The invention claimed is:

1. A method of operating a node of a mesh network, the method comprising:
   determining a neighbor count value, the neighbor count value comprising the number of neighbor nodes associated with the node,
   wherein determining the neighbor count value comprises analyzing network data traffic within the mesh network, and counting the number of unique MAC address from which packets are received in the mesh network; and
   transmitting the neighbor count value to each of the neighbor nodes of the node.

2. The method of claim 1, wherein determining a neighbor count value comprises estimating the number of neighbor nodes to the node.

3. The method of claim 1, wherein when analyzing network data traffic within the mesh network, and counting the number of unique MAC address from which packets are received in the mesh network, the received packets are link layer packets, and include mesh data messages and/or beacon messages.

4. The method of claim 1, wherein determining the number of neighbor nodes is performed within a time window.

5. The method of claim 1, wherein transmitting the neighbor count value to the neighbor nodes of the node comprises including the neighbor count value in a mesh network packet by reusing an existing mesh advertising data type.

6. The method of claim 5, wherein the neighbor count value is conveyed using at least one of: an indicator in a network header identifying the type of the packet, a dedicated transport control opcode, an Application Key Flag, AKF, and Application Key Identifier, AID, field.

7. The method of claim 1, wherein transmitting the neighbor count value to the neighbor nodes of the node comprises including the neighbor count value within a message type that is separate from a beacon message transmitted from the node.

8. The method of claim 1, wherein transmitting the neighbor count value to the neighbor nodes of the node comprises including the neighbor count value within a beacon message transmitted from the node.

9. The method of claim 1, wherein determining the neighbor count value comprises analyzing network data traffic within the mesh network, and counting the number of copies that are received of a mesh network data packet.

10. The method of claim 1, wherein determining the neighbor count value comprises at least one of:
    counting the number of copies that are received of each mesh network data packet;
    counting the number of source mesh addresses, or other identifiers, included in messages received at the node; and
    determining the neighbor count value comprises explicitly inquiring neighbors to send a response message.

11. A method of operating a node of a mesh network, the method comprising:
    receiving a plurality of neighbor count values, each neighbor count value relating to the number of neighbors associated with a particular neighbor of the node; and
    controlling the transmission of a beacon message based on the received neighbor count values.

12. The method of claim 11, wherein controlling the transmission of a beacon message comprises at least one of:
    controlling the scheduling of transmission of a beacon message from the node; and
    controlling the time that a beacon message is transmitted from the node.

13. The method of claim 11, wherein controlling the transmission of a beacon message is related to the lowest neighbor count value associated with neighbor nodes.

14. The method of claim 13, wherein controlling the transmission of a beacon message is inversely proportional to the lowest neighbor count value associated with neighbor nodes.

15. The method of claim 11, wherein controlling the transmission of a beacon message comprises controlling the frequency of transmission of beacon messages from the node.

16. A node for a mesh network, the node being adapted to:
    determine a neighbor count value, the neighbor count value comprising the number of neighbor nodes associated with the node,
    wherein determining the neighbor count value comprises analyzing network data traffic within the mesh network, and counting the number of unique MAC address from which packets are received in the mesh network; and
    transmit the neighbor count value to each of the neighbor nodes of the node.

17. The node of claim 16, wherein determining a neighbor count value comprises estimating the number of neighbor nodes to the node.

18. A node of a mesh network for transmitting beacon messages, the node being adapted to:
    receive a plurality of neighbor count values, each neighbor count value relating to the number of neighbors associated with a particular neighbor of the node; and
    control the transmission of a beacon message based on the received neighbor count values.

19. The node of claim 18, wherein controlling the transmission of a beacon message comprises at least one of:
    controlling the frequency of transmission of beacon messages from the node; controlling the scheduling of transmission of a beacon message from the node; and
    controlling the time that a beacon message is transmitted from the node.

* * * * *